Patented May 22, 1951

2,553,604

UNITED STATES PATENT OFFICE 2,553,604

COATED ROOFING GRANULES AND ASBESTOS-CEMENT SLABS AND METHODS OF MAKING SAME

Gordon R. Pole, White Bear Township, Ramsey County, Minn., assignor to Minnesota Mining & Manufacturing Company, St. Paul, Minn., a corporation of Delaware No Drawing. Application April 3, 1950, Serial No. 153,765

13 Claims. (Cl. 117—27)

This invention relates to coated granular material and to an improved method for applying colored coatings to mineral granules used in surfacing asphalt-coated roofing or siding. The invention also has considerable utility in the coating of calcinable, lithic slabs with a firmly bonded, thin, colored coating which is unfused and unvitrified.

Methods have long been known for the artificial coloring of roofing granules, consisting of crushed and screened minerals, in which the granules are coated with a suitable pigment in an inorganic bond. Preferably this bond is water-insoluble and highly adherent to the base granule. In carrying out these processes the granules are mixed with a pigment and a soluble silicate solution until a thorough coating of the granules is obtained, and the soluble silicate is then insolubilized. The soluble silicate, usually sodium silicate, is converted into the insoluble state by subjecting the coated granules to heat treatment, e. g. roasting temperatures; by chemical action; or by a combination of chemical action and heat treatment. The present invention relates to insolubilization of the silicate by chemical action. In one of the processes of the art, a mixture of sodium silicate, a coloring agent and barium fluosilicate or sodium fluosilicate, as the insolubilizing agent, is used to coat the mineral aggregate, which is then subjected to temperatures up to approximately 600° F. One of the principal difficulties in the use of fluosilicates as insolubilizers is due to the fact that they are difficult to control in the granule coating step. If too much water is used in the mix, the silicate tends to gell, producing a dry, dusty, poorly-bonded coating. Furthermore, the temperature of the silicate mix affects the rate of reaction of the fluosilicate with sodium silicate. Higher temperatures cause an increased rate of reaction and lower temperatures a reduced reaction rate.

It is an object of this invention to produce a colored, weather-resistant, neutral, non-blooming, silicate coating on mineral granules, such as trap rock, syenite, quartz, greystone, dolomite or other granular material used in the surfacing of prepared roofing, siding, or other surface-coated building materials such as asbestos-cement building products.

A further object of this invention is to provide a granular coating process employing insolubilizing agents to neutralize the sodium silicate, which are not appreciably affected by variations of the water content in the coating mixture or by variations in the temperature of the batch that are normally encountered in the coating process.

Still another object of this invention is to produce a neutral, low-temperature silicate-coated granule that has low hygroscopicity. A further object of the invention is to produce a sodium silicate coated granule at low temperatures that is relatively free of "bloom," which normally occurs when the finished granules are exposed to moisture and the moisture is subsequently evaporated. This efflorescence occurs on prepared roofing when it is subjected to certain conditions of wetting and drying either on the roof or in stored bundles of granular-coated shingles.

I have found that the foregoing highly desirable results may be obtained by using a fluoborate as the insolubilizing agent for the soluble silicate bond. In my improved process I have found that sodium fluoborate, when used with an aqueous solution of sodium silicate, does not react immediately with the silicate, even upon prolonged standing at room temperature for periods of 48 hours. Furthermore, raising the temperature of the fluoborate-sodium silicate mixture to 120° F. does not cause setting or gelling. However, when a mixture of sodium silicate and a fluoborate, applied as a granule coating, is heated to approximately 400° F., the fluoborate reacts with the sodium silicate and neutralizes the alkalinity of the coating. The degree of neutralization depends upon the proportion of fluoborate to sodium silicate that is employed in the mixture. For complete neutralization of the silicate, I prefer to employ dry sodium fluoborate to aqueous sodium silicate ("K" brand) on a weight basis, in the ratio of 1 to 5–8.

I have found that sodium fluoborate can be added, either as a fine powder, or as an aqueous solution, to the sodium silicate solution without causing gelling of the silicate. Sodium fluoborate, as well as ammonium fluoborate, are readily soluble in water. The solubility of sodium fluoborate varies from about 108 to 212 grams per hundred cc. of water depending upon the temperature. It is acidic, imparting a pH of approximately 3 to a 1% aqueous solution.

Extensive tests carried out on granules coated with sodium silicate and insolubilized by sodium fluoborate and subsequently fired to approximately 400° F. or higher showed no tendency to "bloom" or effloresce. Likewise such granules have a low hygroscopicity, particularly in comparison with a hygroscopicity of granules neutralized with certain acidic salt solutions. In granules of the latter type, it has been found that under humid conditions the coating absorbs considerable moisture which interferes with the handling of the granules during the shingle manufacturing process. Granules insolubilized with sodium fluoborate absorbed only 25 to 30% of the moisture absorbed by granules insolubilized with certain acidic salt solutions. In this test both batches of granules were exposed at a temperature of 95° F., and a relative humidity of 85 to 90% for a period of two hours.

In accordance with the invention, artificially colored granules and asbestos-cement shingles may be produced having a high color intensity and a wide variety of shades. By reason of the relatively low temperatures employed in coating the granules or shingles, various heat-sensitive pigments, such as yellow hydrated iron oxide, phthalocyanines or other organic pigments may be employed.

I am able to use as a base granule any of a rather wide class of relatively porous or non-porous and weather-resistant rock or minerals. Examples of relatively porous material are trap rocks and slates. Examples of relatively non-porous rocks or minerals are argillite or greystone (such as the large greystone deposits located about five miles north of Wausau, Wisconsin), greenstone, certain granites, etc. Normally it is preferred to employ the relatively non-porous rocks, although even these rocks have a substantial porosity as compared with my finished coatings.

Aqueous sodium silicate is the preferred alkali metal silicate, due to its availability and economy, although equivalent materials such as potassium silicate may also be used. The preferred grade of sodium silicate is the so-called "K" brand, which has a ratio of $Na_2O$ to $SiO_2$ of 1:2.84, a gravity of 47° Baumé, and a solids content of 40-42%. Variations in the alkalinity of the silicate are permissible, but increased alkalinity raises the requirements of the insolubilizer and may, in some cases, provide a small percentage of undesirable soluble alkali material in the final product, while excessive $SiO_2$ content reduces the film-forming properties, as well as the concentration of the silicate. When "K" brand aqueous sodium silicate is employed, the range of weight ratios of powdered sodium fluoborate to sodium silicate solution for complete neutralization of the silicate will vary from 1:5 to 1:8, when reacted within the temperature range of 375° to 500° F. The preferred ratio at temperatures of 450° F. is 4:25. As mentioned, other brands of sodium silicate solution may be used. When using the "O" brand, slightly smaller amounts of sodium fluoborate are required to neutralize the granule coating; for example, one part of powdered sodium fluoborate by weight to 8½ parts of sodium silicate solution. When using the "D" brand of aqueous sodium silicate, larger amounts of sodium fluoborate are required. Satisfactory results have been obtained using one part of powdered sodium fluoborate by weight to 5.5 parts of "D" brand sodium silicate solution. Ammonium fluoborate may, if desired, be employed in place of sodium fluoborate, in whole or in part.

In preparing artificially colored roofing granules in accordance with the invention, the natural mineral is crushed and screened to the desired size, e. g. so as to pass a "10-mesh" screen and be retained on a "35-mesh" screen. The granules are then heated to a temperature of approximately 110-130° F. and are then mixed with the sodium silicate solution, pigment and insolubilizer in a suitable mixer, such as an ordinary concrete mixer or other tumbling-barrel type of mixer. Preferably a slurry of the pigments, sodium silicate and sodium fluoborate is first prepared and then added to the granules. If desired, the sodium fluoborate may be added after the granules have been preliminarily mixed with a slurry of sodium silicate and pigment. However, one of the advantages of my process lies in the fact, unlike other methods, that the insolubilizer does not react appreciably with the sodium silicate at temperatures below 300° F. Accordingly in the interest of economy and eliminating one step of the process it is recommended that the sodium fluoborate be included in the original slurry of pigment and sodium silicate.

After the mineral granules or asbestos-cement shingles are thoroughly coated with a mixture of aqueous sodium silicate, a coloring agent and a sufficient quantity of sodium fluoborate to completely or partially react with the silicate, the coated granules or shingles are dried and then fired at temperatures of 350° to 500° F. If a glazed or vitrified granule is desired the firing temperatures may extend as high as 1200° F. During the firing operation it is believed that sodium silicate reacts with the fluoborate to form silicic acid, fluorides and borates or complex mixtures of these compounds. The exact composition of the reacted coating is difficult to determine. This method produces durably coated, colored granules, or colored surfaces in the case of asbestos-cement shingles, that are weather resistant, free of "blooming," and have decidedly low hygroscopic properties. If desired, lesser amounts of the fluoborate insolubilizers, insufficient to completely neutralize the sodium silicate, may be employed in the mixture and the reacted coating may be further neutralized by subsequent treatment with acids or acid salts.

In coating asbestos-cement compositions, the slurry of sodium silicate, pigment and sodium fluoborate is applied to the surface of the composition and the coating heated at temperatures of 400-500° F., preferably in an infra-red oven. By employing radiant heat, the thin silicate coating may be cured without heating the entire shingle at elevated temperatures. This method of heating serves to eliminate warpage and dehydration of the asbestos-cement body. In preparing a slurry for coating asbestos-cement shingles, the sodium fluoborate is first dissolved in water and is then slowly stirred into the sodium silicate solution. The pigments are then added and the mixture stirred or ball-milled until a homogeneous slip is obtained. The mixture may be brushed or sprayed onto the asbestos-cement shingles and cured in the manner described. Silicate coatings produced in this manner are free of crazing and blisters and have a good gloss.

The following preferred formulae have been satisfactorily employed for the production of artificially colored roofing granules and illustrate several suitable compositions for the coating of roofing granules and asbestos-cement shingles within the scope of my invention.

*Formula 1*

| | Pounds |
|---|---|
| Granules (greystone) | 2000 |
| $Cr_2O_3$—pigment grade | 12.0 |
| Phthalocyanine Green Pigment (20% solids) | 11.0 |
| Wetting Agent | 0.28 |
| Sodium Silicate solution ($Na_2O:SiO_2=1:2.84$) sp. gr. 1.48 | 40.0 |
| Sodium Fluoborate, tech. grade | 6.0 |
| Water | 20.0 |

*Formula 2*

| | Pounds |
|---|---|
| Granules, greystone | 2000 |
| Chromium Oxide, pigment | 10.0 |
| Yellow hydrated iron oxide, pigment | 1.0 |
| Phthalocyanine Green Pigment, (20% solids) | 2.0 |

|   |   |
|---|---|
| | Pounds |
| Zinc Oxide | 2.0 |
| Wetting agent | 0.2 |
| Sodium Fluoborate, tech. grade | 4.0 |
| Sodium Silicate solution "K" brand, sp. gr. 1.48 | 25.0 |
| Water | 12.0 |

Other pigments may be substituted for the pigments of the above formulae to produce granules of colors other than green; for example, iron oxide may be employed if a red granule is desired, etc. Likewise it is to be understood that ammonium fluoborate may be employed in place of sodium fluoborate in whole or in part.

In coating one ton of granules according to the above formulae, the following procedure may be satisfactorily employed.

A slurry of the pigments, a wetting agent preferably comprising an anionic surface active agent such as sulfoxy derivatives of hydrocarbons, sodium fluoborate and sodium silicate solution is first made and is coated on the granules in a suitable mixer such as a tumbling-barrel type of mixer. If desired, the sodium fluoborate in an aqueous solution may be added after the granules have been preliminarily mixed with the slurry of sodium silicate and pigments. However, this additional step is not necessary in view of the stability of the fluoborate and silicate at temperatures below 300° F. The granules are fed into the mixer at 90–130° F., and the mixing is continued until the granules are uniformly coated with the slurry. Air is circulated through the mixture to dry the granules; the partial drying may require five to ten minutes. The granules are then fired, preferably in a rotary kiln at temperatures of 375°–500° F., preferably at about 450° F., although much higher temperatures may be employed if desired and if heat-sensitive pigments are not used. The temperature is normally maintained for about five to twenty minutes, depending on the size of the kiln and other factors, to complete the reaction between sodium silicate and fluoborate, which is believed to form a complex mixture of pigment, partially dehydrated silicic acid, sodium fluoride and sodium metaborate. The exact composition of the resulting mixture is difficult to determine.

The following formulae illustrate modified coating compositions employing lesser amounts of sodium fluoborate than the compositions of Formulae 1 and 2. These formulae may be employed when a less expensive coating composition is desired in that the insolubilizing effect of sodium fluoborate is supplemented by the use of a less expensive acidic salt solution to neutralize the silicate.

Formula 3

|   |   |
|---|---|
| | Pounds |
| Granules (syenite) | 2000 |
| $Cr_2O_3$, pigment grade | 12.0 |
| Ochre, yellow | 2.0 |
| Yellow Iron Oxide (Hydrated) | 1.0 |
| ZnO, 5% PbO | 4.0 |
| Phthalocyanine Green pigment (20% solids) | 2.2 |
| Sodium Silicate solution, sp. gr. 1.48 (Wt. ratio $Na_2O$ to $Si_2O$, 1:2.84) | 29.0 |
| Sodium Fluoborate, tech. grade | 2.0 |
| Water | 24.0 |
| Pickle Solution: | |
| $NH_4Cl$ | 0.7 |
| $AlCl_3$ | 0.7 |
| Water | 64.0 |

Formula 4

|   |   |
|---|---|
| | Pounds |
| Granules, syenite | 2000 |
| Burnt umber | 10.0 |
| Iron Oxide | 3.2 |
| Indian Red | 1.2 |
| Sodium Fluoborate, tech. | 1.2 |
| Cryolite, natural | 3.0 |
| Sodium Silicate solution, "K" brand, sp. gr. 1.48 | 25.0 |
| Water | 12.0 |
| Pickle Solution: | |
| $AlCl_3$ | 0.8 |
| Water | 100.0 |

A slurry of the pigments, sodium silicate solution, sodium fluoborate and cryolite or zinc oxide is first prepared and then added to the granules contained in a mixer of the type described. The granules and slurry are mixed for several minutes until the granules are evenly coated, and then they are dried with a warm air blast until they are of a free-flowing consistency. The granules are then fired at temperatures of 375 to 450 for approximately 10 minutes.

The granules are then fed into a cooler, for example, a rotary tube type of cooler. As the hot granules start through the cooler an insolubilizer solution of ammonium chloride and aluminum chloride are applied to the granules to neutralize the portion of the soda content of the silica that has not reacted with the sodium fluoborate. The residual heat in the granules is at this point more than sufficient to evaporate the water thus added and also to remove any ammonia liberated from the ammonium chloride solution. If desired, ammonium chloride may be omitted from the pickle solution as shown in Formula 4.

The following formula illustrates a suitable coating composition in accordance with the invention in which a different type of sodium silicate solution is employed.

Formula 5

|   |   |
|---|---|
| | Pounds |
| Granules, greystone | 2000 |
| Red Iron Oxide, pigment | 18.0 |
| Sodium Fluoborate, tech. grade | 6.0 |
| Sodium Silicate solution "O" Brand, sp. gr. 1.41 (Wt. ratio $Na_2O$ to $SiO_2$, 1:3.22) | 48.0 |
| Water | 16.0 |

It is to be understood that other pigments may be employed in place of red iron oxide and that ammonium fluoborate may be substituted for sodium fluoborate in this and the other formulae. The coating composition may be prepared and coated on roofing granules in accordance with the method described in connection with Formulae Nos. 1 and 2.

Asphalt shingles surfaced with granules coated in accordance with the foregoing coating compositions have been exposed to the weather at St. Paul, Minnesota, and at Houston, Texas, for periods of two years or longer and have been found to have a strongly bonded, weather-resistant coating that is essentially neutral, is free of moisture "bloom," has a low soluble salt content and has desirably low hygroscopic properties.

The coating compositions of Formulae Nos. 1, 2 and 5 have been satisfactorily employed in coating surfaces of asbestos-cement shingles. A slip is made by dissolving the sodium fluoborate in water and then adding it slowly to the sodium silicate solution. The pigment is then added and the mixture is stirred until a homogeneous slip is obtained. If desired the mixture may be ball-milled for approximately one hour. The slip is then applied to the surface of the asphalt cement shingles by brushing or by spraying it from a ceramic spray gun. The coating may suitably be applied such that one pound of the dry coating composition covers 100 square feet. The coated shingles are immediately placed in an oven, such as an infra-red heated oven, and held at a temperature of 400–450° F. for a period of 7–10 minutes. The shingles are then removed and cooled in the air. The composition applied in the manner described provides a uniform coating that is free of blisters and crazing and has a semi-gloss finish. To obtain a high gloss the ratio of silicate solids to pigment solids should be greater than one. The coatings show good weather resistance after two years of outdoor exposure of the shingles at Houston, Texas, and St. Paul, Minnesota.

I claim:

1. The method of artificially coloring base material which comprises forming a homogeneous slip of pigment, a soluble alkali metal silicate and a fluoborate comprising a member of the group consisting of sodium fluoborate and ammonium fluoborate, said fluoborate being non-reactive with the silicate at room temperatures of the order of 70° F., applying a thin coating of said slip upon the surface of said base material, and then heating said coated surface to temperatures of the order of 375–500° F. to react the silicate and fluoborate to produce a surface substantially devoid of free alkali and of low soluble salt content.

2. The method of artificially coloring granules which comprises coating granules with a mixture of pigment, sodium silicate and sodium fluoborate and then heating the granules to temperatures above 375° F., the dry fluoborate being present in the ratio of one part to 5–8 parts of sodium silicate solution to produce granules which are substantially neutral and relatively non-hygroscopic.

3. The method of applying a colored coating to the surface of mineral granules which comprises coating the surface of the granules with a film-forming composition of a pigment, an aqueous solution of an alkaline silicate, and a fluoborate of the class consisting of sodium fluoborate and ammonium fluoborate, said fluoborate being present in amounts insufficient to completely neutralize the alkali, heating the coated granules for several minutes at temperatures above 375° F., and then applying a neutralizing solution to the surface of the coated granules, said solution consisting of a mixture of aluminum chloride and ammonium chloride.

4. The method of applying a colored coating to the surface of mineral granules which comprises coating the surface of the granules with a film-forming composition of a pigment, an aqueous solution of sodium silicate, and a fluoborate of the class consisting of sodium fluoborate and ammonium fluoborate, said fluoborate being present in amounts insufficient to completely neutralize the alkali, heating the coated granules for several minutes at temperatures above 375° F., and then applying a neutralizing solution to the surface of the coated granules, said solution consisting of aluminum chloride.

5. Artificially colored roofing granules comprising a mineral base coated with a weather-resistant, non-blooming surface coating, said coating including a pigment and an alkaline silicate insolubilized in accordance with the method defined in claim 3.

6. Mineral aggregate having a well-bonded artificially colored surface coating, said coating being substantially non-alkaline and non-blooming and being applied in accordance with the method defined in claim 2.

7. Artificially colored roofing granules having a well-bonded substantially non-alkaline and non-blooming colored surface coating comprising a pigment and an inorganic bond, said bond comprising the heat reaction product of sodium silicate and sodium fluoborate, said fluoborate being present in the ratio of one part of dry fluoborate to 5–8 parts of silicate solution.

8. As a new article of manufacture, roofing granules of the character described having a substantially non-blooming, insoluble surface coating, said coating consisting essentially of the reaction product of ammonium fluoborate and sodium silicate and being substantially neutral and non-hygroscopic.

9. As a new article of manufacture, granules of the class described having on the exterior thereof a substantially non-blooming, neutral coating, said coating consisting essentially of pigment and the reaction product of an alkali metal silicate and a fluoborate of the class consisting of ammonium fluoborate and sodium fluoborate.

10. A composite sheet body for roofing or siding comprising a plastic stratum and an adherent surfacing for the same consisting of artificially colored granules as defined in claim 9.

11. As a new article of manufacture, granules of the class described having on the exterior thereof a substantially non-blooming, neutral coating, said coating consisting essentially of pigment and the reaction product of an alkali metal silicate, cryolite and a fluoborate of the class consisting of ammonium fluoborate and sodium fluoborate.

12. As a new article of manufacture, a preformed asbestos-cement slab having a weather-resistant, unfused and unvitrified colored coating firmly bonded thereto and comprised of the fired, unfused reaction product of an alkali metal silicate, a pigment and a fluoborate of the class consisting of ammonium fluoborate and sodium fluoborate, said silicate and fluoborate being relatively non-reactive at temperatures below approximately 300° F., and being reacted by firing at temperatures of the order of 375° to 500° F. to produce a substantially insoluble and non-blooming product, the cement slab being free from the effects of destructive calcination.

13. The method of producing a weather-resistant colored coating upon an asbestos-cement slab comprising preparing a homogeneous slip of sodium silicate, a pigment and minor proportions of sodium fluoborate, said fluoborate being present in the ratio of one part of powdered fluoborate to 5–8 parts of silicate solution, applying a thin layer of said slip on the surface of said slab and then heating the coated surface to temperatures of the order of 375–500° F.

GORDON R. POLE.

No references cited.